United States Patent [19]

Turck et al.

[11] Patent Number: 4,996,408
[45] Date of Patent: Feb. 26, 1991

[54] PROXIMITY SWITCH FOR USE IN WELDING FACILITIES

[75] Inventors: Werner Turck, Halver; Hans Schumacher, Werdohl, both of Fed. Rep. of Germany

[73] Assignee: Werner Turck GmbH & Co., KG, Halver, Fed. Rep. of Germany

[21] Appl. No.: 430,014

[22] Filed: Nov. 1, 1989

[30] Foreign Application Priority Data

Mar. 17, 1989 [DE] Fed. Rep. of Germany ....... 3908821
Apr. 8, 1989 [DE] Fed. Rep. of Germany ....... 3911598

[51] Int. Cl.$^5$ .............................................. B23K 9/10
[52] U.S. Cl. ................................ 219/130.01; 219/101; 219/137.43
[58] Field of Search ...................... 219/124.34, 137.43, 219/136, 130.01, 101

[56] References Cited

U.S. PATENT DOCUMENTS 3,243,571  3/1966  Schmerling ................... 219/137.43
3,371,272  2/1968  Stanton .......................... 219/124.34
4,206,391  6/1980  Varacins ........................ 219/124.34

Primary Examiner—Clifford C. Shaw
Attorney, Agent, or Firm—Antonelli, Terry, Stout & Kraus

[57] ABSTRACT

An electronic proximity switch adapted to be operated in a non-contact mode for use in a welding zone of welding facility, with the switch being employed for, for example, controlling welding tongs and/or checking a position of welding electrodes. The electronic proximity switch includes a housing provided on at least a portion of a surface thereof exposed to, for example, floating welding globules with an anti-stick coating. A ceramic disk may be provided at a responsive-sensitive end face of the switch, with the ceramic disk also being provided with an anti-stick coating.

5 Claims, 1 Drawing Sheet

PROXIMITY SWITCH FOR USE IN WELDING FACILITIES

BACKGROUND OF THE INVENTION

The present invention relates to an electronic proximity switch and, more particularly, to an electronic proximity switch operating in a non-contact mode in a welding zone of welding facilities, with the proximity switch being adapted to, for example, control welding equipment such as welding tongs and/or check position of welding electrodes.

In welding facilities, especially in welding facilities employing butt welding machines, there is a considerable amount of floating welding globules and sparking or arcing. Conventional proximity switches generally have a housing of brass, steel or a ceramic material so as to readily withstand a corrosive action exerted by the welding environment; however, in all conventional housing materials used for proximity switches, an extensive slag formation is encountered at the proximity switch housing due to the floating welding globules within a relatively short period of time, whereby the switching characteristics and, especially, the response sensitivity of the proximity switch are noticeably impaired.

It has been proposed to utilize, for example, polytetrafluoroethylene caps to counteract the above noted problems; however, the utilization of such caps is disadvantageous in much as the caps themselves reduce an effective spacing especially in front of a response surface of the proximity switch by virtue of the fact that the caps are formed as threaded-on elements.

A further disadvantage of the utilization of caps resides in the fact that, by virtue of the nature of the material, namely, polytetrafluorethylene, it is extremely difficult to secure the caps in place and prevent any detachment of the caps so that any disturbances due to collision with the operating elements of the welding machine can easily arise. Furthermore, with the use of the caps of the aforementioned type, as can readily be appreciated, if the caps become detached, considerable problems arise in carrying out a welding operation.

The aim underlying the present invention essentially resides in providing a proximity switch which includes a housing constructed in such a manner that any slag layer formation along the housing is minimized if not avoided.

In accordance with advantageous features of the present invention, a proximity switch is provided having a housing wherein at least a portion of the housing generally exposed to sparks, arcing, or floating welding globules is provided with an anti-stick coating material of, for example, polytetrafluoroethylene or PFA (with perfluoroalkoxy side chains).

Experimentation by way of voluminous tests has revealed that by virtue of the utilization of such coating, the housings of the proximity switch do not experience any formation of a slag layer or, at most, only a slight adherence of a slag particle with can readily blasted off by means of a jet of compressed air or, the adhesions which may appear surprisingly disappear during a cleaning of the welding electrodes by means of a jet of compressed air.

Advantageously, in accordance with further features of the present invention, the housing of the proximity switch is provided, on a response-sensitive end face thereof, with a ceramic disk provided with an anti-adhesive coating with a shell of the housing consisting of, for example, bare brass having an anti-adhesive coating over at least a region thereof adjoining the response-sensitive end face.

According to the present invention, the ceramic disk is utilized to replace the synthetic resin cap which is usually required in proximity switches, as a thermal protection during application of the anti-stick coating.

BRIEF DESCRIPTION OF THE DRAWINGS

The above and other objects, features, and advantages of the present invention will become more apparent from the following description when taken in connection with the accompanying drawing which shows, for the purposes of illustration only, one embodiment in accordance with the present invention, and wherein.

DETAILED DESCRIPTION

Figure 1:
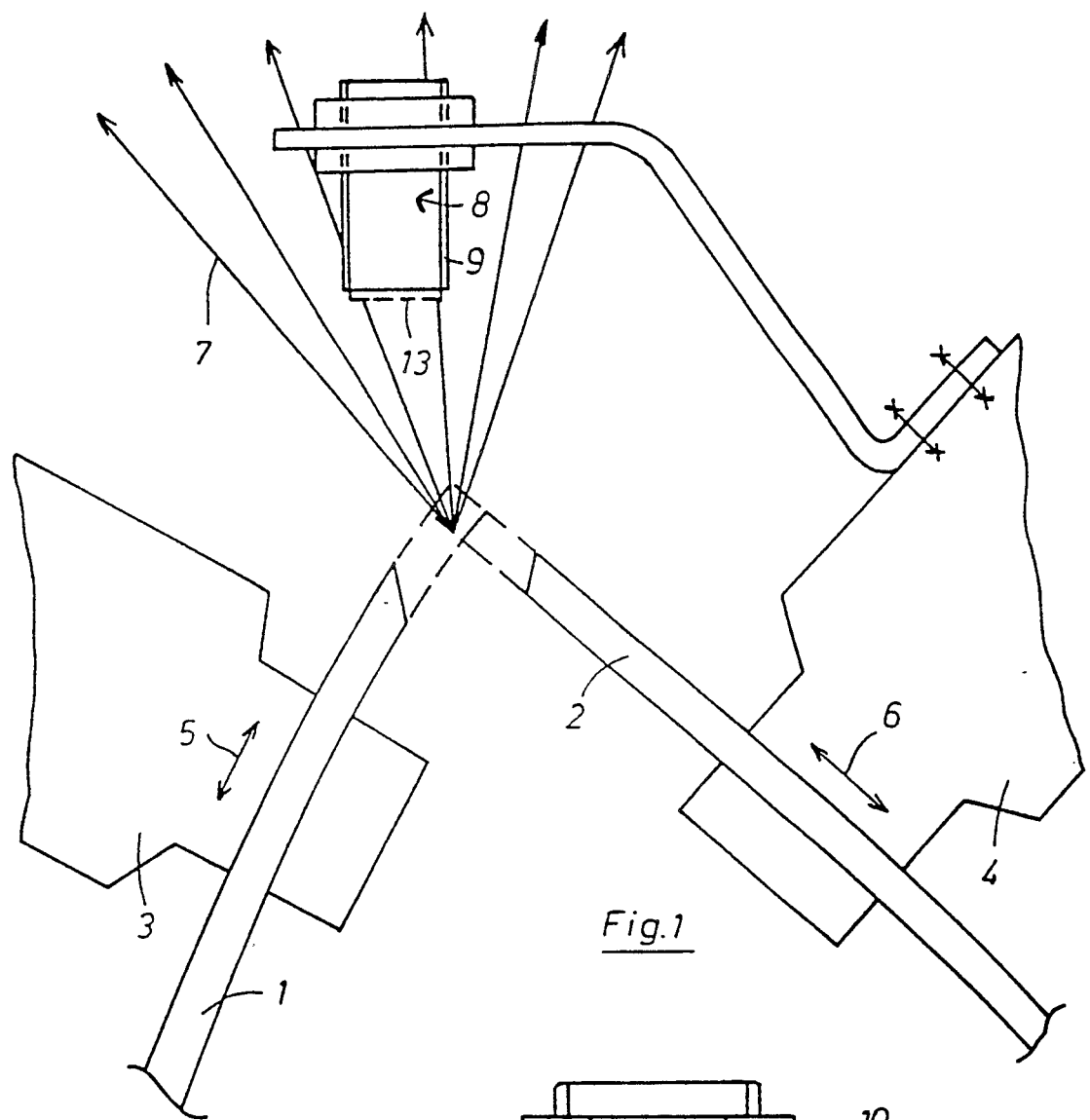
FIG. 1 is a schematic view of a proximity switch constructed in accordance with the present invention arranged in a welding zone of a butt welding facility.

Referring now to the drawings wherein like reference numerals are used in both views to designate like parts and, more particularly, to FIG. 1, according to this figure, a butt welding machine is provided for welding, for example, two light-weight steel profiles 1, 2 into a frame for accommodating, for example, windows for a motor vehicle. The miter-cut steel moldings 1, 2 are inserted into clamping electrodes 3, 4 in a conventional manner and tightened, with the steel profiles or cut steel moldings 1, 2 being moved toward and away from each other in the direction of the arrows 5, 6, in a conventional manner, so that the cut steel moldings 1, 2 come into mutual contact in a region of the miter-cuts. Concomitantly, local heating by burnoff occurs accompanied by a very intensive swarm or path of welding globules indicated by the arrow 7.

The electronic proximity switch generally designated by the reference numeral 8, operating in a non-contact mode, is arranged, in a conventional manner, in a flight path of the welding globules, with the proximity switch 8 being provided, for example, for controlling the welding tongs and/or checking the position of the welding electrodes 3, 4. The proximity switch 8 is attached, in a conventional manner, to the clamping electrode 4 by way of a suitable mounting.

Figure 2:
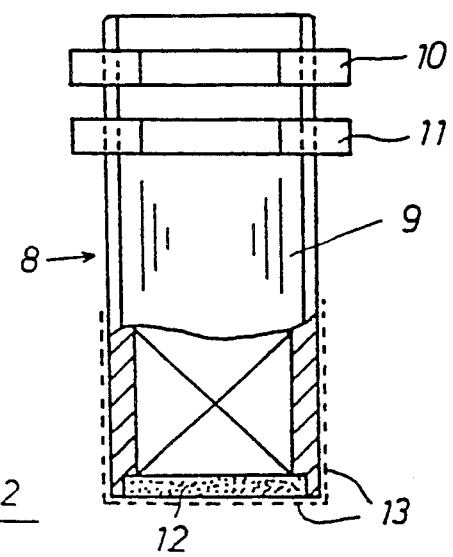
FIG. 2 is a partial cross-sectional enlarged view of the proximity switch of the present invention.

As shown most clearly in FIG. 2, the proximity switch 8 includes a cylindrical basic housing 9 provided with an external thread for accommodating mounting nuts 10, 11. A ceramic disk 12 is provided on an end face of the housing 12 facing the welding zone, with the ceramic disk 12 including a coating 13 of an anti-stick material such as, for example, polytetrafluoroethylene or PFA. The anti-stick coating is preferably in the form of a layer having a thickness of 18–30 microns and is applied in three layers, with each layer having a thickness of 6–10 microns. Preferably, the anti-stick coating 13 has a thickness of 24 microns. Additionally, suitable additives or pigments are added to the anti-stick coating such as, for example, mica or mixtures of mica, carbon black, and rock flour.

The cylindrical basic housing 9 may be fashioned of a bare brass and, advantageously, a layer of the anti-stick coating 13 may also be extended to portions of the housing 9 adjoining the ceramic disk 10 so that a formation of a slag layer resulting from impinging welding globules is suppressed not only at the ceramic disk 12 but also in the end rim area of the housing and on at least a portion of the outer cylindrical surface of the housing 9.

While we have shown and described only one embodiment in accordance with the present invention, it is understood that the same is not limited thereto but is susceptible to numerous changes and modifications as known to on of ordinary skill in the art, and we therefore do not wish to be limited to the details shown and described herein, but intend to cover all such modifications as are encompassed by the scope of the appended claims.

We claim:

1. An electronic proximity switch means adapted to be operated in a non-contact mode for use in a welding zone of a welding means, the electronic proximity switch means including a brass housing, a ceramic disc provided on a responsive-sensitive end face of said switch means, and a coating of anti-stick material provided on a surface of the ceramic disc facing the welding means and on at least a front area of the housing facing the welding means for preventing a formation of a layer of material resulting from a welding operation on the ceramic disc and at least a front area of the housing.

2. An electronic proximity switch means according to claim 1, wherein said coating is formed of a plurality of layers of anti-stick material.

3. An electronic proximity switch means according to claim 2, wherein each of said layers has a thickness of between 6-10 microns.

4. An electronic proximity switch means according to one of claims 1, 2 or 3, wherein the anti-stock material consists essentially of polytetrafluoroethylene.

5. An electronic proximity switch means according to one of claims 1, 2 or 3, wherein the anti-stick material consists essentially of polytetrafluoroethylene with perfluoroalkoxy side chains.

* * * * *